United States Patent
Palmeri

[19]

[11] Patent Number: 5,876,302
[45] Date of Patent: Mar. 2, 1999

[54] ENGINE CONTROL WITH HIGHER TORQUE AT DIRECT DRIVE TRANSMISSION RATIOS

[75] Inventor: Frank A. Palmeri, Troy, Mich.

[73] Assignee: Meritor Heavy Vehicle Systems, LLC, Troy, Mich.

[21] Appl. No.: 785,407

[22] Filed: Jan. 22, 1997

[51] Int. Cl.[6] .................................................. F16H 55/06
[52] U.S. Cl. .............................................................. 477/111
[58] Field of Search ............................................. 477/111

[56] References Cited

U.S. PATENT DOCUMENTS

| | | | |
|---|---|---|---|
| 5,048,372 | 9/1991 | Sodeno et al. | 477/111 |
| 5,409,432 | 4/1995 | Steeby | 477/71 |
| 5,679,096 | 10/1997 | Stine et al. | 477/111 |

OTHER PUBLICATIONS

"Machine Design", Deutschman, et al., Macmillan Pub., pp 126–128, 1975.
Caterpillar Brochure "3406B PEEC Torque Ratings" ©1989 Caterpillar.
Caterpillar Brochure "3406C Multi–Torque" (no date).

*Primary Examiner*—Dirk Wright

[57] ABSTRACT

An improved method for operating a engine, a transmission, and an associated electronic control module for the engine includes setting maximum torque levels for the engine by the electronic control module. The electronic control module determines the speed ratio of the transmission and sets a first relatively high torque load when it is determined that the transmission is in direct drive. If the electronic control module determines that the transmission is in non-direct drive then it sets a lower maximum torque load. The present invention has recognized that when in direct drive, the transmission may transmit higher torque loads than it would be able to do when it is in a gear reduction mode. In this way, the present invention increases the maximum torque rating for the transmission at its highest speed ratio.

6 Claims, 1 Drawing Sheet

| SPEED RATIO | T MAX |
|---|---|
| 1:1 | 1650 lb/ft |
| NOT 1:1 | 1450 lb/ft |

ENGINE CONTROL WITH HIGHER TORQUE AT DIRECT DRIVE TRANSMISSION RATIOS

BACKGROUND OF THE INVENTION

This invention relates to a method of allowing increased engine torque at certain transmission ratios.

In the prior art, transmissions and engines are becoming increasingly complex. In particular, transmissions for heavy vehicles such as trucks include a number of speed ratios. The speed ratios are provided by shifting gears into and out of engagement to selectively apply gear reduction to a rotational speed supplied by the engine to the transmission.

Transmissions can be one of two general types. Some transmissions have an overdrive capability such that the speed out of the transmission may actually be higher than the speed from the engine. However, it has been found that such overdrive transmissions are less energy efficient at the higher speed ratios than a second type, known as a direct drive transmission.

In a direct drive transmission, the highest speed ratio is a direct drive from the transmission input shaft to the transmission output shaft. The transmission input shaft is connected to the crankshaft of the engine. In one well-known type of direct drive transmission, ten speed ratios are available. By selectively connecting the input shaft to a transmission main shaft, and the transmission main shaft directly to the transmission output shaft, a one-to-one direct drive is provided. This supplies the highest speed ratio from the transmission.

The transmission also allows nine lower speed ratios by selectively engaging other gears. Essentially, the direct connection between the transmission input shaft and the transmission main shaft is broken. Instead, rotation is transmitted through counter shafts and associated gears that, in combination, result in a speed reduction to the transmission main shaft. This type of transmission is well-known and very successful.

Transmissions are rated for a maximum torque that can be transmitted through the transmission and to the transmission output shaft. Typically, a control module for the engine is provided with information on a maximum torque level. The transmission that is associated with the engine must be rated for transmitting that maximum torque level. The engine control module thus limits the torque from the engine that is transmitted to the transmission. Recently, engine manufacturers and vehicle designers have begun to request higher torque loads be transmitted through the transmission under certain conditions. It has been difficult for the transmission designer to accommodate these higher torque loads.

SUMMARY OF THE INVENTION

The engine controls typically utilized are becoming very sophisticated. The amount of torque delivered from the engine to the transmission input shaft varies upon the necessary conditions of the operation of the vehicle being experienced at any moment. Thus, an engine designer would like to have wide torque range available from the engine under at least certain drive conditions. The highest torque is typically necessary when the engine is driving in its highest speed ratio. Thus, it would provide a great benefit to allow a higher torque load from the engine to the transmission, particularly at high speed ratios.

In a disclosed embodiment of this invention, an improved method for operating a transmission, engine, and associated control for the engine allows the transmission of higher torques than have been previously been available. The present invention has recognized that higher torque loads can be transmitted through a direct drive transmission when the transmission is in direct drive. In particular, the invention limits the torque transmitted from the engine to the transmission to a lower level when the transmission is not in direct drive, but allows a higher level during direct drive. The transmission is able to transmit higher torque loads when in direct drive or the highest speed ratio. Thus, when the transmission is in the tenth speed ratio, (for a ten speed transmission) a higher torque load is available. By utilizing this technique, the present invention is able to meet the specification demands of the engine and vehicle designers.

Typically, the engine designer desires the higher torque loads at the higher speed ratios. Thus, by monitoring the speed ratio in which the transmission is operating, and identifying when the transmission is in its direct drive, a control module for the engine is able to identify opportunities when higher torque loads may be allowed.

In a disclosed embodiment of this invention, an electric control module for the engine monitors the speed ratio from the transmission. If the electronic control module determines the transmission is in direct drive, then it allows the engine to have a higher maximum torque. If the electronic control module determines that the transmission is not in direct drive, it sets the maximum torque from the engine at a lower level. In one disclosed embodiment, if the electronic control module determines the speed ratio is direct drive, or the highest gear available, then the maximum torque ratio may be set to 1650 lb/ft. However, if the electronic control module determines the transmission is in some other lower speed ratio, then the maximum torque allowed from the engine may be set to 1450 lb/ft.

These and other features of the present invention will be best understood from the following specification and drawings, of which the following is a brief description.

DETAILED DESCRIPTION OF THE PREFERRED EMBODIMENT

Figures 1, 2:
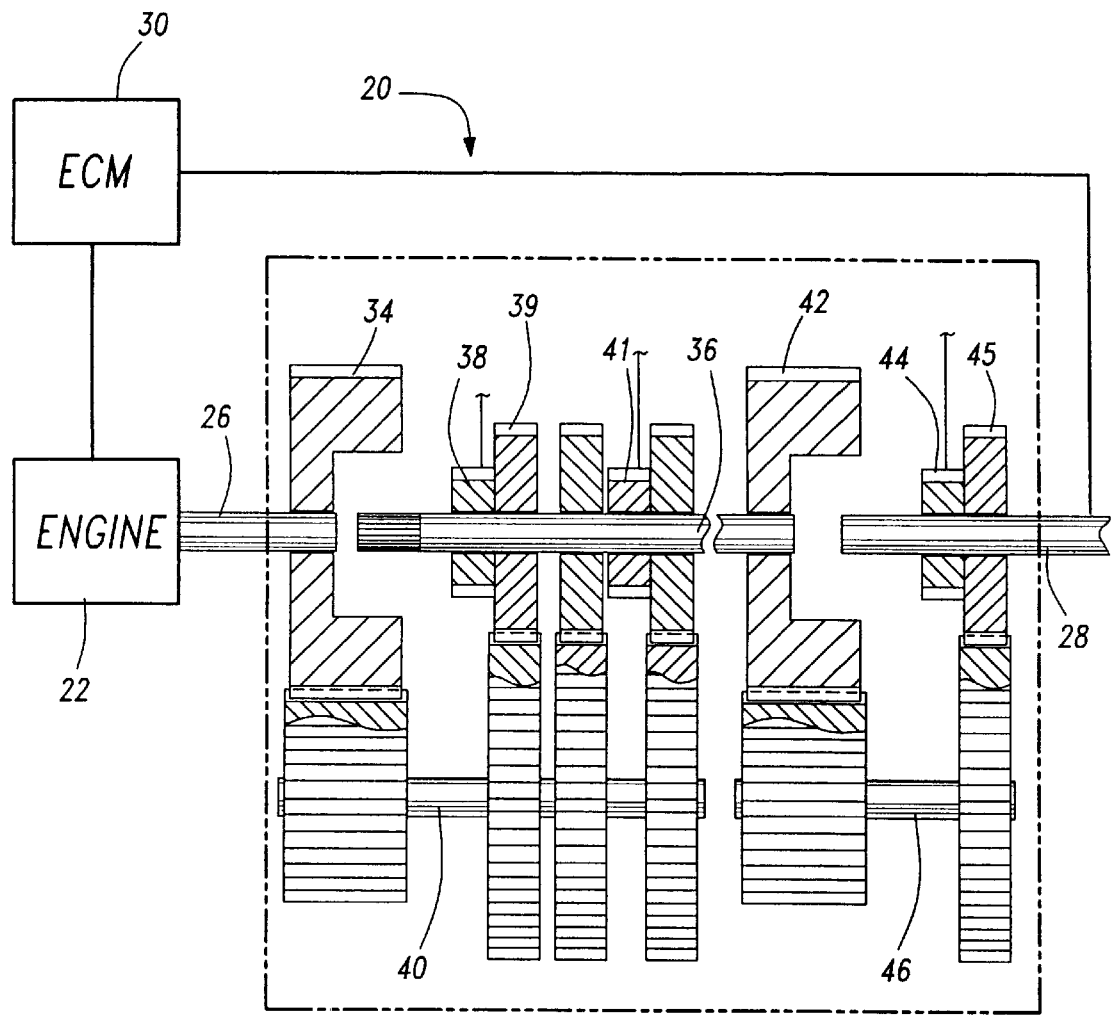
FIG. 1 is a schematic view of an engine, transmission and associated control module.
FIG. 2 is a table showing information that may be stored in memory in the electronic control module of the present invention.

An improved transmission and drive system 20 for a heavy vehicle is shown in FIG. 1. An engine 22 drives a transmission 24 through a transmission input shaft 26, which is connected to the engine crankshaft. An output shaft 28 of the transmission is utilized to drive the vehicle. An electronic control module 30 for the engine 22 is provided with feedback information through line 32 of the speed of output shaft 28. The feedback for line 32 may actually be provided by a communication from the speedometer for the vehicle. Other methods of providing this feedback may also be utilized. The electronic control module is operable for comparing the speed from shaft 28 to the speed from shaft 26 to determine the speed ratio from transmission 28. In its highest gear ratio, transmission 24 transmits a speed ratio of 1:1 between shafts 26 and 28. At lower speed ratios, the ratio is less than one. The speed ratios are set at predetermined steps, and once the ratio is identified, the electronic control module 30 compares the ratio to a look-up table and determines the speed ratio in which transmission 24 is presently engaged.

Transmission 24 is shown somewhat schematically in FIG. 1 as the type of transmission which is in direct drive at its highest speed ratio. The operation of the transmission is known in the art, and is only included here to provide an understanding of how the invention is applied to such transmissions. Also, the structure of the disclosed transmission is not limiting on the scope of this invention.

As known, a gear 34 is fixed for rotation with engine output shaft 26. A transmission main shaft 36 is spaced from shaft 26 and is selectively placed into or out of engagement with shaft 26 by moving collar 38 such that it engages gear 34. When collar 38 is moved to the left from the position shown in FIG. 1, then rotation is transmitted from shaft 26, through gear 34, through collar 38, and directly into main shaft 36 at a 1:1 speed ratio. However, when collar 38 is in the illustrated position in FIG. 1, it engages a gear 39. Torque is then transmitted from gear 34, through gears associated with counter-shafts 40 (only one of which is shown), and back through gear 39 to main shaft 36. The gears associated with the counter-shafts 40 may be selectively changed by moving collar 38 out of engagement with gear 39, and moving another collar, such as collar 41, to engage a gear. By selecting one of the gears to be engaged between the counter-shafts 40 and main shaft 36, various speed ratios can be selected.

As shown, a second unit may be used at the opposed end of the transmission 24. The second unit is typically known as a range or auxiliary box. The effect of the range or auxiliary box is to effectively double the number of speed ratios provided by the transmission. Various types of range boxes are known and the disclosed embodiment is an overly simplified example. Shaft 36 is fixed with a gear 42. A collar 44 slides into or out of engagement with gear 42. Collar 44 is fixed to rotate with output shaft 28. If the collar 44 is moved to the left from the position shown in FIG. 1, then rotation is direct between shaft 36, gear 42, collar 44, and to output shaft 28. However, if the collar 44 is in the position illustrated in FIG. 1, it engages gear 45, and then torque is transmitted from shaft 36 to shaft 28 by gear 42, into gears associated with counter-shafts 46 and then to gear 45. The gears associated with counter-shafts 46 provide a gear reduction.

When the two collars 38 and 44 are shifted to the left from the position shown in FIG. 1, then there is a direct transmission of rotation from shaft 26, to shaft 36, and from shaft 36 to shaft 28. In this position, the transmission 24 is providing a speed ratio of 1:1 between shafts 26 and 28. This is preferably the highest speed ratio available from the transmission 24.

The present invention has recognized that when in this direct drive speed ratio, transmission 24 is better equipped to transmit torque than it would be if the transmission of rotation where passing through counter-shafts 40 and/or 46. Thus, the present invention identifies when the transmission 24 is in this direct drive position at electronic control module 30. When a determination is made that the direct transmission drive is in effect, then the electronic control module is operable to allow a higher maximum torque load from engine 22 to the engine output shaft 26. When the electronic control module determines that a lower speed ratio is in effect, then the electronic control module will limit the highest torque load from engine 22 to shaft 26 to a lower load. As known, the module 30 may be equipped to round a determined ratio to the nearest of the actual available ratios in the transmission. Further, when this application refers to comparing the speeds of shafts 26 and 28, the actual comparison may be in fact performed indirectly. As an example, module 30 would know the engine output speed, and thus in comparing the speed of shaft 26 may use this stored information.

FIG. 2 shows a look-up table within the electronic control module 30 that may store information with regard to available maximum torque. As shown, the look-up table provides information to the electronic control module to determine that when a 1:1 speed ratio is in place, the maximum allowable torque from the engine is 1650 lb/ft. The look-up table may also indicate that in the event the speed ratio is not 1:1 then the maximum torque allowed would be 1450 lb/ft. In this way, the present invention protects the transmission 24 while still accommodating the higher torque loads demanded by engine and vehicle designers and manufacturers.

One modification to the transmission is that, given the higher torque loads, it may be desirable to perform shot-peening on the shafts 26, 36 and 28. This would allow the shafts to transmit the higher torques that would be encountered under this invention.

A preferred embodiment of this invention has been disclosed, however, a worker of ordinary skill in the art would recognize that certain modifications would come within the scope of this invention. For that reason, the following claims should be studied to determine the true scope and content of this invention.

I claim:

1. A system for driving a vehicle comprising:

an engine operable to rotate a transmission input shaft at varying torque levels and speeds, said transmission input shaft being shot-peened to allow it to carry higher torque loads;

a transmission connected to be driven by said transmission input shaft, said transmission having an output shaft, and said transmission being operable to take a rotational speed from said transmission input shaft, and vary the speed ratio of said transmission input shaft to any one of a plurality of selected speed ratios, and drive said transmission output shaft at a speed multiplied by the speed of said transmission input shaft and said selected speed ratio; and an electronic control module for controlling said engine, said electronic control module being operable to set a maximum torque from said engine to said transmission input shaft, said electronic control module being operable to determine the speed ratio of said transmission, and said electronic control module setting a first relatively high maximum torque load for said engine when a first set of said speed ratios of said transmission are in effect, and said electronic control module setting a second lower maximum torque load for said engine when other speed ratios are in effect on said transmission, said transmission includes a plurality of gear reductions that may be selected such that the highest speed ratio through said transmission is one, and said first set of speed ratios includes only said highest speed ratio.

2. A system as recited in claim 1, wherein said highest speed ratio is above 1600 lb/ft., and said lower speed ratio is below 1500 lb/ft.

3. A system as recited in claim 1, wherein said 1:1 speed ratio is in the tenth of ten available speed ratios.

4. A system as recited in claim 1, wherein said electronic control module determines the present speed ratio from said transmission by determining the speed of said transmission output shaft, and comparing said speed and the speed of said transmission input shaft.

5. A system as recited in claim 4, wherein said the electronic control module gets its information on the speed of said transmission output shaft from a speedometer for the vehicle.

6. A method of controlling an engine and transmission comprising the steps of:

1) providing an engine driving a transmission input shaft and a transmission to be driven by said transmission input shaft, shot-peening said transmission input shaft to allow it to carry higher torque loads, said transmission having a plurality of selectable speed ratios, and said transmission having a transmission output shaft, said selectable speed ratios being operable to vary the speed ratio between said transmission input shaft and said transmission output shaft to any one of several available speed ratios, said transmission having a highest speed ratio of 1:1, which is provided by a direct connection between said transmission input shaft and said transmission output shaft;

2) monitoring the speed ratio of said transmission through a control for said engine, said control for said engine being operable to set a maximum torque load from said engine to said shaft; and 3) setting a first higher maximum torque load when said transmission is determined to be in said highest speed ratio, and setting a second lower maximum torque load when said transmission is determined to be in speed ratios lower than said highest speed ratio.

* * * * *